W. Hart.
Blacksmiths' Tongs.
Nº 18,971. Patented Dec. 29, 1857.
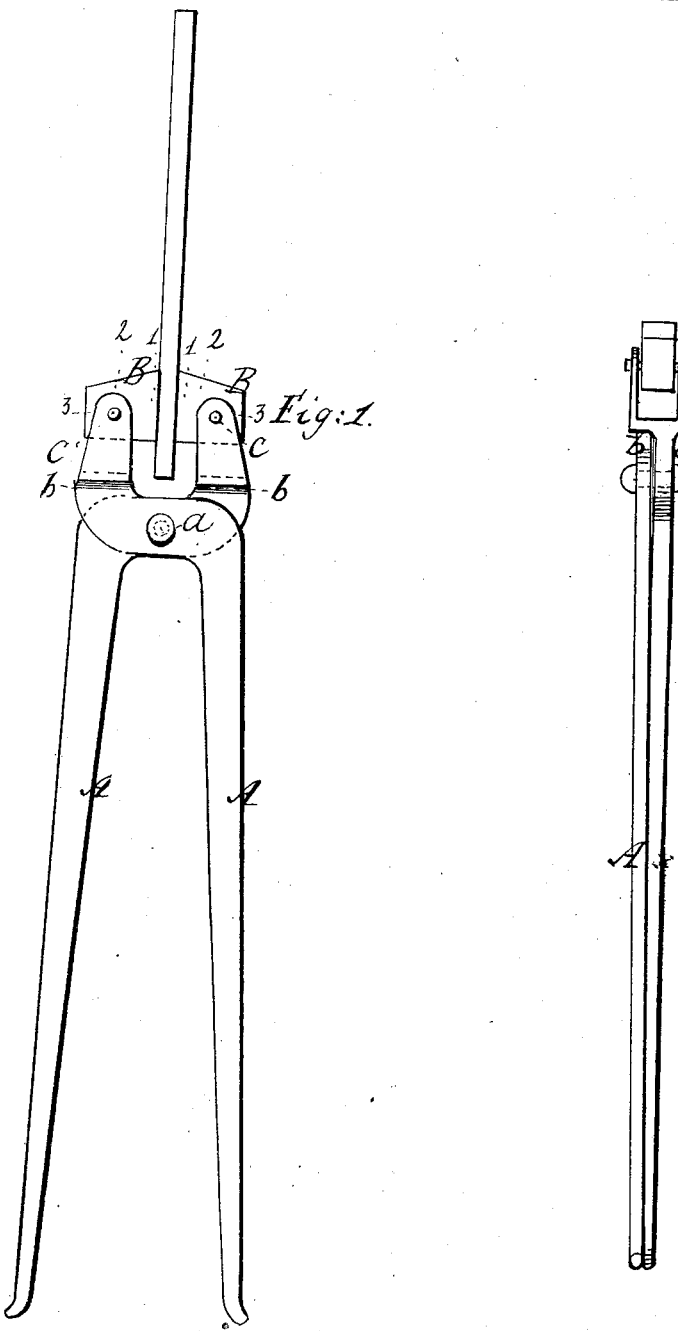
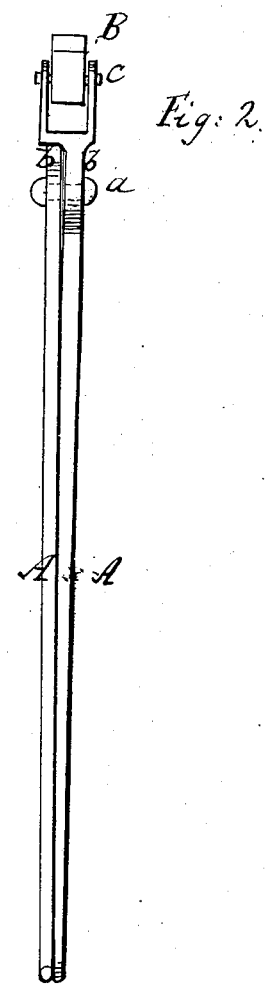

UNITED STATES PATENT OFFICE.

WILLIAM HART, OF MAYVILLE, WISCONSIN.

IMPROVEMENT IN BLACKSMITHS' TONGS.

Specification forming part of Letters Patent No. 18,971, dated December 29, 1857.

*To all whom it may concern:*

Be it known that I, WILLIAM HART, of Mayville, in the county of Dodge and State of Wisconsin, have invented a new and useful Improvement in Tongs for Blacksmiths and other Artisans; and I do hereby declare that the following is a full, clear, and exact description of the same, reference being had to the annexed drawings, making a part of this specification, in which—

Figure 1 is a side view of my improvement. Fig. 2 is an edge view of the same.

Similar letters of reference indicate corresponding parts in the two figures.

My invention consists in having revolving jaws fitted in the ends of the shanks of the tongs, the sides or edges of the jaws being at varying distances from the axes of the jaws, as will be hereinafter fully shown and described, whereby different-sized articles may be grasped by the tongs by turning the jaws so that the proper sides may grasp the article, and articles of taper form also be held firmly by the jaws.

To enable those skilled in the art to fully understand and construct my invention, I will proceed to describe it.

A A represent the handles of the tongs, which are curved, cross each other, and are connected by a pivot $a$ in the usual manner. The ends of the shanks $b\ b$ of the handles A A are forked, as shown clearly in Fig. 2, and jaws B are fitted therein, one jaw in each fork. These jaws may have straight and oblique sides, and the jaws are fitted on axes $c$, which pass through or have their bearing in the sides of the forks, the jaws being allowed to turn freely on their axes. The axes of the jaws do not pass through their centers, but pass through them at such points so that the different sides of the jaws are at varying distances from them.

By the above improvement it will be seen that large or small articles may be grasped by the jaws, for the jaws may be turned so as to bring opposite to each other the sides that are nearer to or farther from the axes $c$, and, as the jaws are allowed to turn freely on their axes, they will conform to the sides of the articles to be grasped, whether the sides are parallel or angular with each other. Thus straight or taper articles may be grasped and held firmly by the tongs. The different sides of the jaws may be numbered, so that the corresponding sides of the two jaws may always be turned opposite each other.

This implement, it will be seen, possesses many advantages over those in use, for the jaws will turn in a parallel as well as in an oblique position with each other and in all cases form a perfect bearing upon the article between them.

I do not claim, broadly, the providing of blacksmiths' tongs with movable jaws, for they are not new. An example may be seen in the English patent of James Brodie, dated February 27, 1855. His drawings show a number of different applications to vises, tongs, &c., of movable or oscillating jaws; but in none of his modifications do the jaws revolve. The instrument constructed upon his plan is therefore comparatively limited in its uses.

My improvement greatly augments the utility of the tongs. Under Brodie's plan the tool can be used for holding only two or three different sizes of articles; but a pair of tongs made on my plan can be used for holding about three times as many sizes as there are sides to the revolving jaws. Thus if the jaws are made six-sided about eighteen different-sized articles can be held by one pair of tongs.

Having thus described my invention, what I claim as new, and desire to secure by Letters Patent, is—

Constructing the tongs with revolving jaws B B placed or fitted in the shanks $b$, substantially as described, for the purpose set forth.

WILLIAM HART.

Witnesses:
E. B. BOWEN,
A. M. BOWEN.